United States Patent
Tsubouchi

[15] 3,654,956
[45] Apr. 11, 1972

[54] SEALED RESERVOIR FOR HYDRAULIC BRAKE SYSTEMS

[72] Inventor: Kaoru Tsubouchi, Kariya, Japan
[73] Assignee: Aisin Seiki Kabushiki Kaisha, Kariya-shi, Japan
[22] Filed: Dec. 22, 1970
[21] Appl. No.: 100,633

[30] Foreign Application Priority Data

Dec. 25, 1969 Japan....................................44/1107

[52] U.S. Cl. ..........................137/558, 60/54.6 R, 220/85 B, 85/46, 138/30
[51] Int. Cl.......................................B65d 25/00, F16l 55/04
[58] Field of Search........................137/557, 558; 60/54.6 R; 85/46; 138/26, 30; 220/85 B, 26 S, 93

[56] References Cited

UNITED STATES PATENTS

| | | | |
|---|---|---|---|
| 1,840,100 | 1/1932 | Jacobsen............................ | 137/558 X |
| 3,196,617 | 7/1965 | Ferrell et al........................ | 60/54.6 R |
| 3,233,411 | 2/1966 | Schubert............................. | 60/54.6 R |

*Primary Examiner*—Henry T. Klinksiek
*Attorney*—Berman, Davidson & Berman

[57] ABSTRACT

Disclosed herein is a reservoir of a master cylinder for hydraulic brake systems in which a cap is screw threaded over a casing, and the screw threads of the cap and the casing form a spiral air-passageway to communicate atmospheric pressure onto a brake fluid seal. The seal includes a float member and a resilient member having a radially extended annular portion, a thick-walled portion to form a chamber against the casing wall and a vertically expansible portion to hold the floating member at the top end thereof. The chamber between the casing wall and the resilient member stores excess brake fluid as well as contaminants therein and the resilient member lets the float member float up and down in accordance with increases and decreases of the brake fluid quantity so as to maintain constantly good sealing effect.

9 Claims, 1 Drawing Figure

PATENTED APR 11 1972 3,654,956
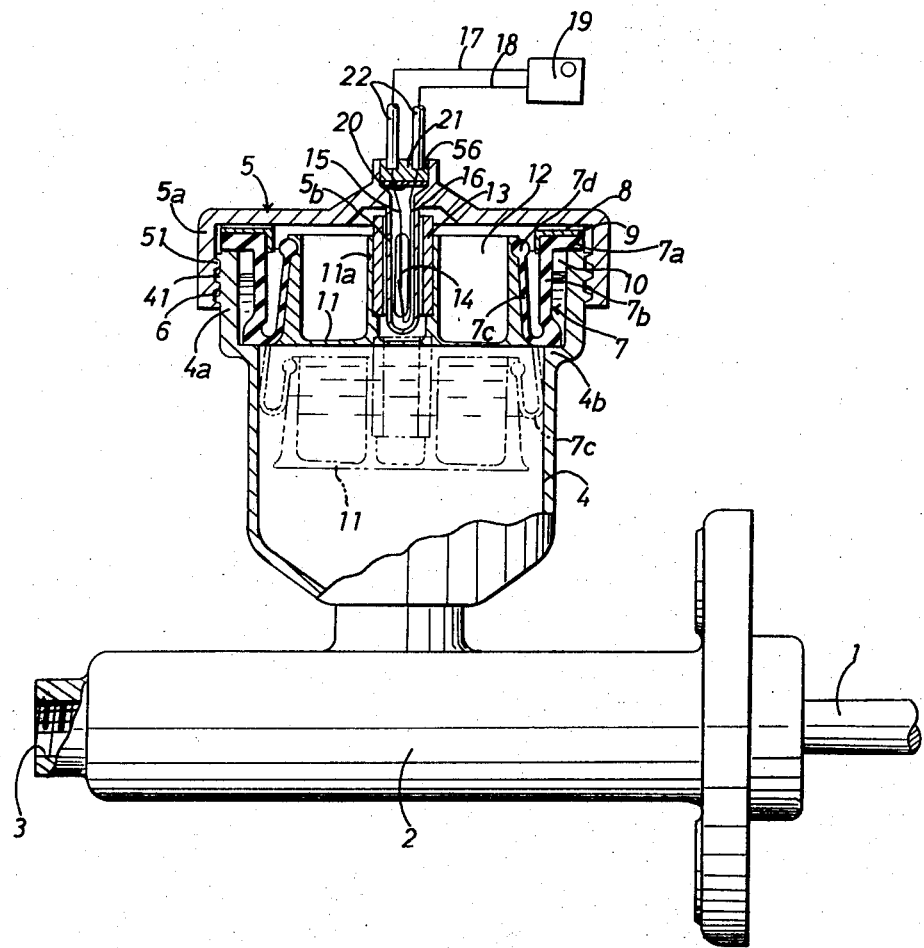
INVENTOR
KAORU TSUBOUCHI
BY Berman, Davidson & Berman,
ATTORNEYS.

SEALED RESERVOIR FOR HYDRAULIC BRAKE SYSTEMS

The present invention relates to a hydraulic brake fluid reservoir of a hydraulic brake master cylinder, and more particularly to a sealed reservoir in which brake fluid is constantly sealed against the surrounding air regardless of increases or decreases of the brake fluid.

The primary object of the present invention is to provide a sealed reservoir which can store excess brake fluid in a portion therein outside the seal, while the brake fluid is perfectly sealed against the surrounding air, the excess quantity being prevented from overflowing over the outside wall of the reservoir casing.

Another object of the present invention is to provide a sealed reservoir capable of preventing contaminents from reaching the brake fluid and to increase the sealing effect on the brake fluid even during quantity changes of the brake fluid.

A further object of the present invention is to provide a sealed reservoir on the master cylinder to maintain the function thereof by permitting the seal to move when further supply of the brake fluid is required on decrease of the brake fluid sealed within the reservoir.

A still further object of the present invention is to provide a sealed reservoir within which a conventional alarm is installed to issue alarms at a dangerous decrease in the quantity of the brake fluid.

In accordance with one embodiment of the present invention, a sealed reservoir includes a casing having a stepped upper portion and a cap screw threaded over the outer circumferential wall of the casing, the male and female screw threads of the casing and the cap forming a spiral air-passage to communicate contaminants pressure onto a seal installed within the casing; the seal includes a float member sealing the brake fluid against the surrounding air led into a space formed between the float member and the cap through the spiral air-passage and a resilient member. The resilient member includes a radially extended portion to intervene between the upper annular edge of the casing and the cap, a perpendicular thick-walled portion which is pressed on the stepped portion of the casing to form a chamber against the inner wall of the casing so as to store excess brake fluid as well as the contaminents floating on the surface of the excess brake fluid and a vertically expansible portion to hold the floating member at the top end thereof as well as to let the floating member float up and down in accordance with increases and decreases of the regular brake fluid quantity by means of extending and shrinking action thereof.

The above-mentioned and further objects and features of the present invention will become clear from the following description in reference to the accompanying drawing, which shows an elevational view partially in section covering a master cylinder with a hydraulic brake fluid reservoir in accordance with the present invention.

Now referring to the drawing, described in detail is a preferred embodiment of the present invention. A longitudinal body 2 of a conventional master cylinder has a longitudinal cylindrical bore in which a piston (not shown in the drawing) is reciprocatably mounted, the piston having a piston rod 1 on one end thereof. Pressure on a brake pedal connected to the piston rod 1 produces fluid pressure within the cylindrical bore of the longitudinal body 2. The fluid pressure is then delivered through an outlet port 3 of the body 2 to the hydraulic brake system, supplying necessary hydraulic brake pressure to arrest the movement of the vehicle.

A reservoir casing 4 is formed in one piece with the longitudinal body 2 of the master cylinder to constantly store brake fluid therein as a supply for the master cylinder. A cap 5 is screw threaded over the outer circumferential wall of the neck 4a of the casing 4. On the outer circumferential wall of the neck 4a are screw threads 41 with a trapezoid cross-section in which the axial length at the recessed portion is twice as long as that at the top portion. Screw threads 51 are formed on the inner circumference of the perpendicular annular flange 5a of the cap 5, the cross-section of the screw threads 51 are the same as that of the screw threads 41 of the casing 4. Thus, a spiral air-passage 6 is formed along the free or unengaged slopes of the screw threads.

A resilient member 7 includes a radial extending annular portion 7a, a thick-walled portion 7b and a vertically expansible portion 7c. The radial extending annular portion 7a is interposed between the cap 5 and the annular edge of the opening portion 4a of the casing 4. The resilient member 7 is made of soft elastic materials such as natural rubber. A gasket 9 is further interposed between the radially extended annular portion 7a and the cap 5, cooperating with the cap 5 to form a passageway 8. The thick-walled portion 7b adheres tightly on a stepped portion 4b of the casing 4 and extends downwardly to form an annular chamber 10 between the outer circumference thereof and the inner circumference of the peripheral wall of the neck 4a of the casing 4. The expansible portion 7c has an enlarged bead 7d at the top edge thereof which engages in an annular groove in the float member 11 made of rigid materials such as light metal, hard rubber, hard synthetic resin and the likes.

In assembling the reservoir unit, brake fluid is filled in a quantity slightly over the level of the stepped portion 4b of the casing 4 in the preferred embodiment. The intervention of the gasket 9 and the radially extended annular portion 7a of the resilient member 7 holding the float member 11 at the bead 7d thereof works to seal perfectly the brake fluid when the cap 5 is secured over the casing 4. Excess brake fluid and contaminants floating on the surface of the excess brake fluid are stored within the annular chamber 10 between the outer circumference of the peripheral wall of the neck 4a of the casing 4 without causing any leakage. The resilient member 7 prevents the excess brake fluid in the annular chamber 10 from mixing into the brake fluid within the casing 4.

As the brake fluid flows from the casing 4 into the master cylinder 2 the resilient member 7 expands downwardly as shown with the dot and dash line in the drawing so that the float member 11 follows the level of the brake fluid. An air chamber 12 is formed with the float member 11, the resilient member 7, the gasket 9 and the cap 5, being constantly in communication with the surrounding air through the passageway 8 of the gasket 9 and the spiral passage 6 formed by engagement between the male and female screw threads respectively provided on the opening portion 4a of the casing 4 and the cap 5.

The float member 11 has a socket portion 11a at the center thereof. And a permanent magnet 13 is pressed into the socket portion 11a, with the permanent magnet 13 having its positive pole upward and its negative pole downward. A switch 14 of a conventional magnetic type is placed within a central boss 5b of the cap 5, being actuated by the magnetic field of the permanent magnet 13 so as to open and close the contacts thereof. Two pieces of wire 15 and 16 extend from the switch 14 and are connected to the conductive wires 17 and 18 respectively. The conductive wires 17 and 18 are connected electrically to alarm device 19 which gives the driver of the vehicle alarm when the brake fluid within the casing 4 reduces extraordinarily. The lead wires 15 and 16 are respectively connected to the conductive wire 17 and 18 at the opening 56 of the central boss 5b on the cap 5. A separating plate 20 is secured firmly within the opening 56 to protect the connections of the wire and to provide insulation at the wire connecting points. A bushing 21 formed of material such as chemical glue poured and hardened in place with insulating bushings 22 for the wire captured therein.

In the use and operation of the invention the air chamber 12 of the casing 4 communicates always with the surrounding air, which enables the brake fluid within the casing 4 to flow to and from the casing 4 and cylinder 2 through the outlet port 3 in response to the reciprocation of the piston operated by the push rod 1. This produces positive and negative pressure slightly in the casing 4, which causes expanding and returning movements of the expansible portion 7c of the resilient member 7 and vertical movements of the float member 11 supported by the expansible portion 7c and the bead 7d of the resilient member 7 in contact with the surface of the brake fluid.

When the quantity of the brake fluid in the casing 4 is decreased by leakage and/or abrasion of the master cylinder assembly parts, the resilient member 7 expands the expansible portion 7c thereof in response to the decreased quantity of the brake fluid, maintaining the sealing of the brake fluid. Consequently, the float member 11 held by the bead 7d of the resilient member 7 and being in contact with the surface of the brake fluid goes down as shown with the dot and dash line in the drawing. At the same time the permanent magnet 13 pressed in the socket portion 11a of the float member 11 is also moved down. When the relative distance of the permanent magnet 13 to the switch 14 becomes more than a predetermined one, the magnetic field of the permanent magnet 13 is weakened and thus the switch 14 opens to operate the alarm device 19.

In the preferred embodiment of the present invention, storage of excess brake fluid in the annular chamber 10 between the thick-walled portion 7b of the resilient member 7 and the peripheral inner wall of the casing 4 eliminates contaminents from the sealed in brake fluid and keeps this brake fluid apart entirely from the surrounding air. This prevents the sealed in brake fluid from deteriorating by precipitation of floating contaminents and mixture of the surrounding moisture. Thus with the better sealing effect, the assembling work of the reservoir unit can be done easily without overflow of the brake fluid along the outer annular peripheral wall of the casing 4. And when the supply of the brake fluid to the brake system is required after the full expansion of the resilient member 7, the float member 11 disengages from the bead 7d of the resilient member 7 due to the negative pressure in the casing 4 so as to release the sealing. This permits the master cylinder 2 to maintain its function and prevents any possible danger that might be caused by its inoperativeness.

Although the present invention has been illustrated and described in connection with a specific embodiment, various adoptation and modifications will become apparent to those skilled in the art from the description in conjunction with the appended claims without departing from the scope and spirit of the present invention.

What I claim is:

1. A reservoir of a master cylinder for hydraulic brake systems, comprising a casing connected to the cylindrical bore of said master cylinder and provided with a stepped portion at the upper inner circumferential wall thereof, a cap detachably secured over the outer circumferential wall of a neck extending upward from said stepped portion, a resilient member including a radial extending annular portion interposed between the upper annular edge of said neck and the inner circumferential wall of said cap, a thick-walled portion extending downward from said radial extending annular portion, said thick-walled portion having the lower end thereof engaging the stepped portion of said casing and with the outer diameter thereof smaller than the diameter of the inner circumferential wall of said neck, and a vertically expansible annular portion extending from the lower end of said thick-walled portion, a float member in air-tight connection with the top end of said vertically expansible annular portion, and means for communicating the surrounding air with the chamber formed between said float member and the inner circumferential wall of said cap, said thick-walled portion of said resilient member and said inner circumferential wall of said neck cooperating to form a chamber to store an excess quantity of the brake fluid, said vertically expansible annular portion of said resilient member being adapted to move vertically in accordance with increases and decreases of the quantity of the brake fluid in the brake system by means of expanding and shrinking action of said vertically expansible annular portion of said resilient member.

2. A reservoir of a master cylinder as claimed in claim 1, wherein said vertically expansible annular portion of said resilient member has an annular bead connected to the upper portion of said float member.

3. A reservoir of a master cylinder as claimed in claim 2, wherein said float member and said resilient member are made of elastic material selected from the group including natural rubber, synthetic rubber or rubber-like materials.

4. A reservoir of a master cylinder as claimed in claim 1, wherein said float member is air-tightly but detachably connected to said vertically expansible annular portion of said resilient member, whereby said float member is freed from said expansible portion when the surface of the brake fluid within said casing is lowered beyond the level with said expansible portion in the full expansion thereof.

5. A reservoir of a master cylinder as claimed in claim 4, wherein said float member is made of rigid material selected from the group including light metal, hard natural rubber, hard synthetic resin and the like and said resilient member is made of elastic material selected from the group including natural rubber, synthetic rubber or rubber-like materials.

6. A reservoir of a master cylinder as claimed in claim 5, wherein the upper end of said vertically expansible portion of said resilient member is an annular bead having a circular cross-section and said float member is of a cylindrical shape with a U-shaped cross-section and has an annular groove at the upper outer circumference thereof with said bead of said expansible portion pressed therein, so that said float member is connected air-tightly but detachably to said bead of said expansible portion.

7. A reservoir of a master cylinder as claimed in claim 5, wherein said float member is provided with a sensing device for issuing an alarm when the brake fluid falls below the lowest normal level thereof.

8. A reservoir of a master cylinder as claimed in claim 1, wherein said means for communicating the surrounding air with said chamber between said float member and said inner circumferential wall of said cap comprises a radial passageway formed between said inner wall of said cap and a gasket placed on said radially extended annular portion of said resilient member and a spiral air-passage running through along the unengaging slopes of the said screw threads said screw threads each having a trapezoid cross-section in which the axial length at the recessed portion is substantially twice as long as that at the top end.

9. A reservoir of a master cylinder for hydraulic brake systems comprising a casing connected to the cylindrical bore of said master cylinder, a cap detachably screw-threaded over the upper opening portion of said casing, sealing means for sealing brake fluid within said casing against the surrounding air and communicating means for leading the surrounding air onto said sealing means, wherein said communicating means comprising a spiral air-passage formed between screw threads provided respectively on the outer circumference of said casing and on the inner perpendicular wall of said cap, both screw threads so designed as to have a longer width at the recessed portion than the projected portion.

* * * * *

UNITED STATES PATENT OFFICE
CERTIFICATE OF CORRECTION

Patent No. 3,654,956    Dated April 11, 1972

Inventor(s) Kaoru Tsubouchi

It is certified that error appears in the above-identified patent and that said Letters Patent are hereby corrected as shown below:

Column 1, line 42, column 2, lines 7 and 14, column 3, line 23, each occurrence, "thick-walled" should read -- wall --. Column 1, after line 28, insert the following paragraph --It is a still further object of the present invention to provide a sealed reservoir having communication means for leading atmospheric pressure onto the brake fluid sealing device within the reservoir, the communication means being of simple construction and efficiently-proofed against entry of water and contaminants.--.

Column 2, line 36, after "casing 4" should read -- Consequently there is no possibility for air to enter the brake system, and a perfect airless condition is maintained in the portions of the system under the float member 11 and the resilient member 7. --. Column 3, line 8, after "assembly parts" should read -- or abrasion of the brake linings --; line 34, after "member 7" should read -- a certain quantity of the brake fluid remaining at this moment in the reservoir and the brake fluid decreasing further, --; line 38, after "inoperativeness" should read -- due to non-supply of the brake fluid --; lines 55, 57 and 66, "thick-walled" should read -- wall --. In the Abstract, line 9, "thick-walled" should read -- wall --.

Signed and sealed this 21st day of November 1972.

(SEAL)
Attest:

EDWARD M. FLETCHER, JR.
Attesting Officer

ROBERT GOTTSCHALK
Commissioner of Patents